United States Patent [19]

Takahashi et al.

[11] Patent Number: 4,681,669

[45] Date of Patent: Jul. 21, 1987

[54] METHOD FOR PRODUCING MAGNETIC RECORDING MEDIA

[75] Inventors: Toshiro Takahashi; Tadao Tokushima, both of Hamamatsu; Yoshifumi Suzuki, Iwata; Yukio Wakui, Hamamatsu, all of Japan

[73] Assignee: Nippon Gakki Seizo Kabushiki Kaisha, Hamamatsu, Japan

[21] Appl. No.: 798,234

[22] Filed: Nov. 14, 1985

[30] Foreign Application Priority Data

Nov. 16, 1984 [JP] Japan ............................... 59-241838

[51] Int. Cl.[4] ............................................. C25D 11/20
[52] U.S. Cl. ................................... 204/35.1; 204/37.6; 204/42
[58] Field of Search ..................... 204/35.1, 37.6, 42; 427/130

[56] References Cited

U.S. PATENT DOCUMENTS

| 4,109,287 | 8/1978 | Kawai et al. | 360/131 |
| 4,430,387 | 2/1984 | Nakagawa et al. | 428/579 |
| 4,548,682 | 10/1985 | Yoshida et al. | 204/35.1 |
| 4,563,397 | 1/1986 | Ishignro et al. | 428/469 |

Primary Examiner—Andrew H. Metz
Assistant Examiner—William T. Leader
Attorney, Agent, or Firm—Sachs & Sachs

[57] ABSTRACT

In production of magnetic recording media by anode oxidation of an Al predominant substrate, deposition of ferromagnetic substance in substrate pores and final grinding, use of a substrate having a surface K-value of 0.5 or larger enables easy production of media with surface roughness well suited for ideal high density magnetic recording. The K-value is the ratio of X-ray reflection intensity of the crystal plane S(1,1,1) and the toal X-ray reflection intensity of all crystal planes.

1 Claim, 12 Drawing Figures

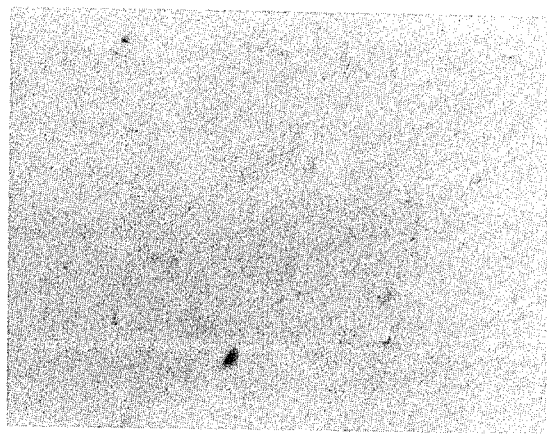
Fig. 2A (111)
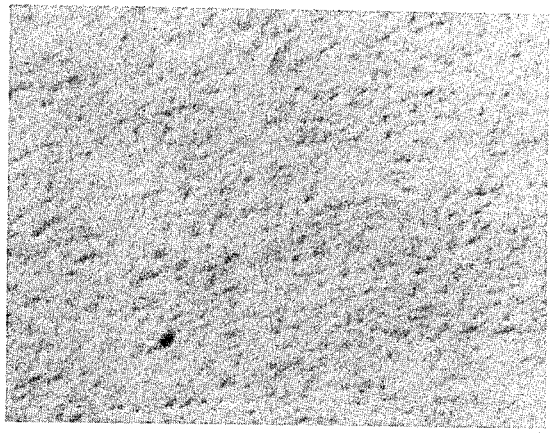
Fig. 2B (110)
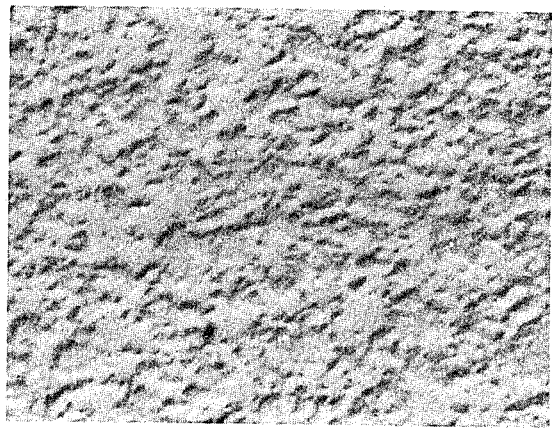
Fig. 2C (100)

METHOD FOR PRODUCING MAGNETIC RECORDING MEDIA

BACKGROUND OF THE INVENTION

The present invention relates to improved method for producing magnetic recording media, and more particularly relates to an improvement in production of magnetic recording media by anode oxidation of an Al predominant substrate, deposition of ferromagnetic substance in substrate pores and final surface grinding.

For better high density magnetic recording, a magnetic recording layer should preferably be as thin as possible and the gap between the magnetic recording layer and a magnetic head should preferably as small as possible. Since degree of packing of ferromangetic substance is usually uneven in construction of a magnetic recording medium produced by ferromagnetic substance deposition in Al oxidized surface layer pores, grinding is applied to the surface of the magnetic recording medium after the deposition in order to even the length of ferromagnetic substance poles in the pores and obtain a thickness necessary for intended magnetic recording.

The surface roughness (Ra) of the Al substrate is in general adjusted to 0.01 μm or less by grinding or diamond cutting.

As remarked above, the gap between a magnetic recording medium and a magnetic head should preferably as small as possible. More specifically, the gap should be about 1/10 the recording wave length. Thus surface grinding of the Al substrate must have high accuracy.

During anode oxidation, the surface of the Al substrate is marred due to etching by the acid or alkali used for the treatment. Even when the original surface roughness of the Al substrate is 0.01 μm or less, the resultant surface roughness exceeds this value and no intended surface smoothness is obtainable by surface grinding or cutting to be applied after ferromagnetic substance packing.

When surface finishing is effected by cutting, accuracy of the product is swayed by production accuracy of the cutting machine. With current standard of cutting machines, it is difficult to produce high surface smoothness after anode oxidation by mechanical cutting. Machines used for grinding in general have high production accuracy. But, in this case, accuracy of the product is swayed by that of the crude workpiece. In the case of the conventional methods, surface accuracy of the magnetic recording medium is inevitably degraded by the high surface roughness after the anode oxidation. Thus, the gap between magnetic recording media and a magnetic head cannot be minimized as desired from the viewpoint of high recording density.

SUMMARY OF THE INVENTION

It is the object of the present invention to significantly lower surface roughness after anode oxidation on an Al substrate in order to obtain, after ferromagnetic substance packing, high surface smoothness of a magnetic recording medium adapted for high density magnetic recording.

In accordance with the basic aspect of the present invention, an Al predominant substrate used for production has crystals of specified plane direction. Here, the term "Al predominant substrate" refers to a substrate made of Al or Al-base alloys.

BRIEF DESCRIPTION OF THE DRAWINGS

FIGS. 2A to 2C are microscopic photos of an oxidized surface layer in various crystal planes.

DESCRIPTION OF THE PREFERRED EMBODIMENTS

The present invention is based on recognition of the fact that the level of surface accuracy of a magnetic recording medium is closely related to the degree of surface roughness after anode oxidation on an Al predominant substrate. Starting from this basic recognition, crystallographical analysis was applied to the correlation between plane directions of Al crystal, surface roughness of the Al predominant substrate after anode oxidation and ferromagnetic substance packing, surface hardness of the Al predominant substrate, and degree of packing of the ferromagnetic substance. As a result, it was confirmed that the surface roughness is closely related to the plane directions of the Al predominant substrate although the degree of packing of the ferromagnetic substance and the surface hardness of the Al predominant substrate have no relationship to the plane directions. It was further confirmed that the least and therefore most favorable surface roughnesses are obtained after anode oxidation and ferromagnetic substance packing by use of an Al predominant substrate of a crystal plane (1 1 1) by Miller indices.

EXAMPLE

Al predominant substrate of 99.99% purity having various crystal planes were prepared by rolling of Al-base alloy material. The surface roughness (Ra) was 0.005 μm. Al surface layers of 3 μm were formed on glass substrates of 0.005 μm or less surface roughness at various substrate temperatures, angles of incidence and speeds of deposition. By anode oxidation, a porous oxidized surface layer of 2 μm was developed on each crude substrate. Pore diameter was 460 Å and cell size was 1200 Å. Thereafter, Fe was deposited by electrolysis and grinding was applied to the surface.

Resultant surface roughness was measured and results are shown in FIGS. 1 and 2A to 2C. It is clear that a substrate with (1 1 1) crystal plane has the highest surface accuracy and a substrate with (100) crystal plane has the lowest surface accuracy.

Figure 3A:
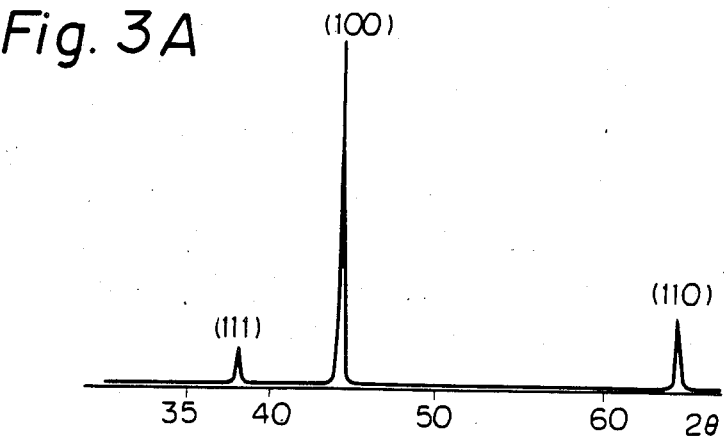
FIGS. 3A to 3C are graphs for showing X-ray refraction patterns of various Al predominant substrates.
Figure 3B:
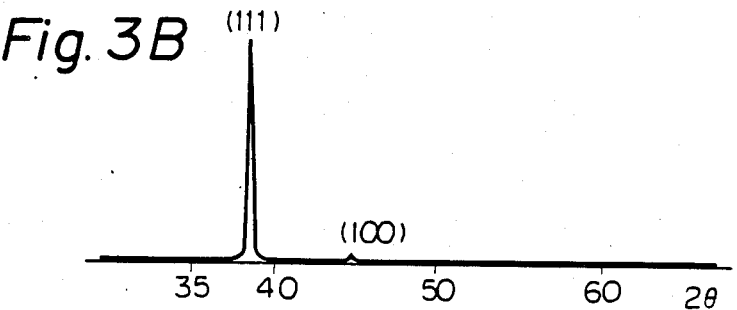
Figure 3C:
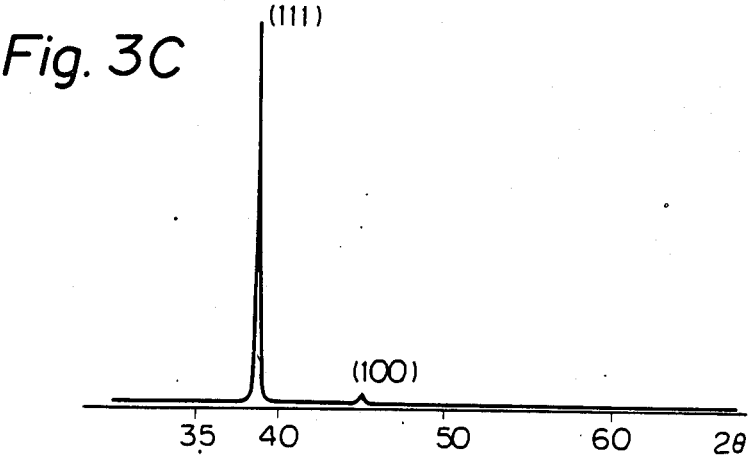

X-ray refraction patterns are shown in FIGS. 3A to 3C, for a substrate made of rolled Al, a glass substrate with Al deposited by evaporation in a vacuum and a glass substrate with sputtered Al. The rolled Al substrate in FIG. 3A is significantly rich in (100) crystal plane but very poor in (1 1 1) crystal plane. This warrants the fact that rolled Al substrate is no good in surface roughness. Vacuum deposition was carried out at a speed of 0.3 μm/min and sputtering was at a speed of 0.2 μm/min, both with 100° C. or higher substrate temperature. This yielded the Al deposited on the glass substrates shown in FIGS. 3B and 3C which are predominatly occupied by (1 1 1) crystal plane.

Figure 4A:
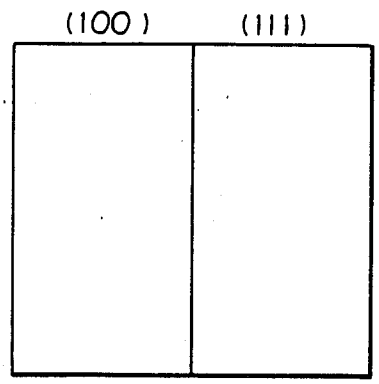
FIGS. 4A and 4B are models for showing difference in speed of growth of the oxidized layer at crystal planes (1 1 1) and (1 0 0)
Figure 4B:
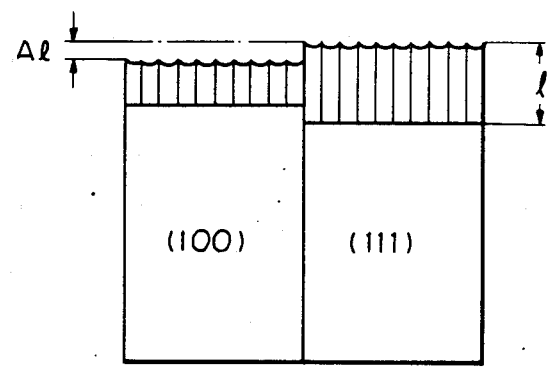

In the case of anode oxidation of the rolled Al substrate, different crystal planes have different reaction speeds in anode oxidation as shown in FIGS. 4A and 4B. Such difference in reaction speed and inherent crystal plane roughness concur to develop unevenness on the oxidized surface layer which amounts to maximum about 1.5% of its thickness. FIG. 4A microscopically shows the state of the crystal planes (1 1 1) and (1 0 0) before anode oxidation and ferromagnetic packing whereas FIG. 4B those after these treatments. Here Δl/l ≦ 0.015.

Figure 5:
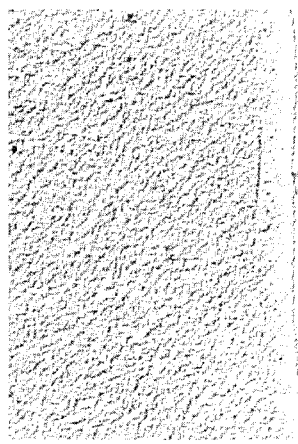
FIG. 5 is a microscopic photo of the oxidized surface layer.
Figure 6:
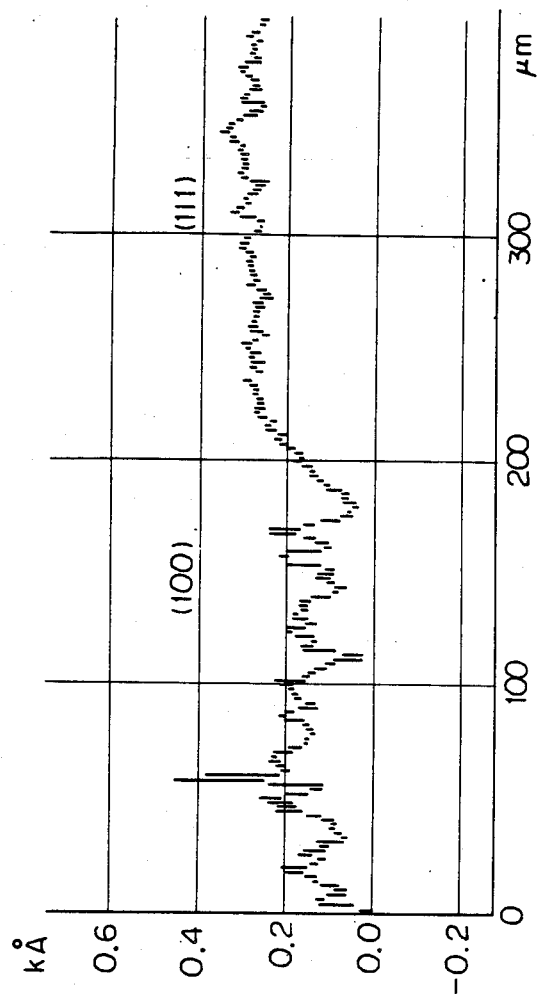
FIG. 6 is a graph for showing surface roughness of the oxidized surface layer.

FIG. 5 is a microscopic representation (200 magnification) of the surface of a magnetic recording medium using the above-described substrate with (1 1 1) and (100) crystal planes. FIG. 6 also shows surface roughness on the magnetic recording medium. Clear difference in surface roughness is observed between (1 1 1) and (100) crystal planes.

Figure 1:
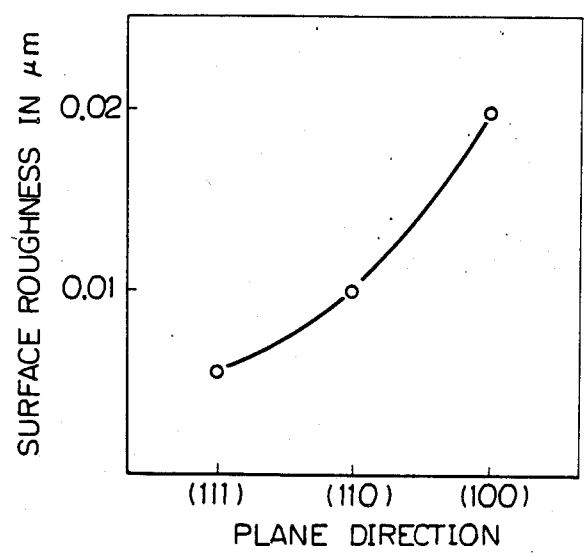
FIG. 1 is a graph for showing the relationship between plane direction of Al crystal and surface roughness after anode oxidation.
Figure 7:
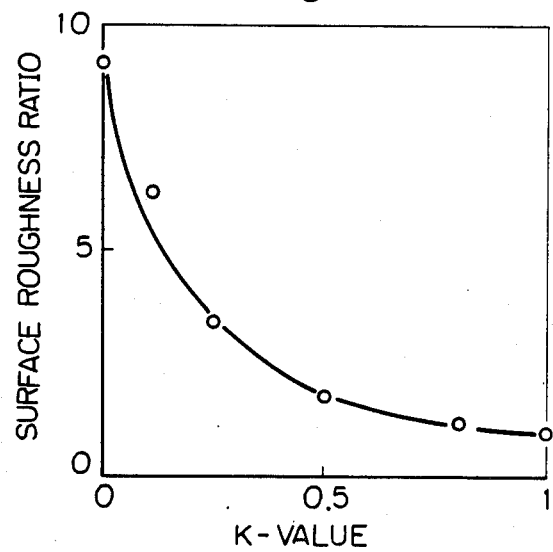
FIG. 7 is a graph for showing the relationship between the K-value and the surface roughness ratio.

After anode oxidation and ferromagnetic substance packing, grinding by 1 μm thickness was applied to an Al surface layer having crystal planes of various percentages and resultant surface roughnesses are graphically shown in FIG. 7 in which K-value is taken on the abscissa and surface roughness ratio is taken on the ordinate. Here, the K-value is a ratio of X-ray reflection intensity of the crystal plane and the total S(1 1 1) X-ray reflection intensity [ΣS(h k l)] of all crystal planes. Whereas the surface roughness ratio is a ratio of surface roughness of Al of random crystal planes with respect to Al totally of (1 1 1) crystal plane.

As is clear from the data in FIG. 7, good result is obtained with surface roughness when the K-value is 0.5 or larger. Any K-value below 0.5 develops surface unevenness of about 1.5% of the oxidized surface layer as shown in FIGS. 4 to 6. Later grinding cannot remove such surface roughness to the extent of that of the surface layer totally of (1 1 1) crystal plane. Good results are obtained with surface roughness when an Al predominant substrate has a K-value of 0.5 or larger.

Surface grinding was carried out using SiO₂ particles of 0.2 μm diameter of 50 RPM rotation speed.

In accordance with the present invention, use of an Al predominant substrate having a K-value of 0.5 or larger enables easy production of magnetic recording media with surface roughness well suited for ideal high density magnetic recording.

We claim:

1. Improved method for producing magnetic recording media comprising the steps of subjecting an Al predominant substrate to anode oxidation to form thereon an Al surface layer with pores, depositing ferromagnetic substance in said pores of said Al surface layer, and grinding said Al surface layer, the surface of said Al predominant substrate having a K-value specified by $$K = \frac{S(1\,1\,1)}{\Sigma S(h\,k\,l)} \geqq 0.5$$

in which S (1 1 1) is the X-ray reflection intensity by the (1 1 1) crystal plane of Al and ΣS (h k l) is the total X-ray reflection intensity by all crystal planes of Al, both by Miller indices.

* * * * *